US006939165B1

(12) United States Patent
Wu

(10) Patent No.: US 6,939,165 B1
(45) Date of Patent: Sep. 6, 2005

(54) CABLE CONNECTOR ASSEMBLY WITH CABLE HOLDER

(75) Inventor: Jerry Wu, Irvine, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/897,881

(22) Filed: Jul. 22, 2004

(51) Int. Cl.⁷ .......................................... H01R 12/24
(52) U.S. Cl. .................................. 439/492; 248/68.1
(58) Field of Search ............................. 439/464, 465, 439/466, 467, 492, 499, 942; 248/68.1

(56) References Cited

U.S. PATENT DOCUMENTS

| | | | |
|---|---|---|---|
| 5,038,001 A | | 8/1991 | Koegel et al. |
| 5,566,269 A | * | 10/1996 | Eberle, Jr. et al. .......... 385/137 |
| 5,727,971 A | | 3/1998 | Junkins et al. |
| 5,992,802 A | * | 11/1999 | Campbell .................. 248/68.1 |
| 6,203,376 B1 | | 3/2001 | Magajne et al. |
| 6,322,034 B1 | * | 11/2001 | O'Malley .............. 248/346.02 |
| 6,485,325 B1 | * | 11/2002 | Fukuda ........................ 439/465 |
| 6,561,466 B1 | * | 5/2003 | Myers et al. .............. 248/74.4 |
| 6,695,641 B1 | | 2/2004 | Lee |

* cited by examiner

Primary Examiner—Thanh-Tam Le
(74) Attorney, Agent, or Firm—Wei Te Chung

(57) ABSTRACT

A cable holder (4) can reliably hold plural different types of cables together in an array in side-by-side parallel relationship and includes a pair of hermaphroditic half holding members (5, 6) each having a plurality of half receiving chambers (51). The half receiving chambers are separated from each other by intervening land portions (52). A plurality of latches (53) and corresponding through slots (54) are disposed on the land portion at two opposite sides of the receiving chambers. Each latch comprises a pair of latching arms (530) projecting from an end surface of the land portion and each having a hook (532) in a distal end thereof. A pair of shoulders (542) are disposed at two opposite ends of the through slot for engaging with the hooks. The half receiving chamber has at least one retention rib (510).

3 Claims, 6 Drawing Sheets

CABLE CONNECTOR ASSEMBLY WITH CABLE HOLDER

BACKGROUND OF THE INVENTION

1. Field of the Invention

The present invention generally relates to a cable connector assembly, and more particularly to a cable connector assembly with a cable holder that facilitates orientation of cables in a position for ease in wire handling.

2. Description of Related Art

A cable connector assembly usually includes some discrete cables arranged in a side-by-side mode and electrical connectors connected to opposite ends of these cables. When these cables have a longer length, it is considered to facilitate orientation of these cables as a whole for ease in wire handling. U.S. Pat. No. 5,727,971 discloses a cable assembly including a ribbon cable with electrical connectors terminating opposite ends thereof. By adopting the ribbon cable, a plurality of conductors are wrapped by a wrapper to a flat whole. But not all connectors are constructed for connection solely to a ribbon cable, and even some connectors need connect simultaneously with different types of cables. For example, U.S. Pat. No. 6,695,641 B1 discloses such an electrical connector which connects a plurality of discrete wires and a Serial ATA cable. Because the Serial ATA cable is thick and rigid while these discrete wire is thin and soft, it is very difficult to keep the cable and these wires in a same plane. Thus, it is necessary to provide a cable holder on the longer cables.

U.S. Pat. No. 5,038,001, assigned to AMP Inc. and issued on Aug. 6, 1991, discloses a fixture for orienting multiple cables. The fixture includes a pair of jaws that close together. The cables are threaded through a series of open eyes between the jaws. However, the eyes must conform to the shape of the profile of the cable, that is to say, each half eye of each jaw must have a given shape. Therefore, the fixture can not be widely used in a cable connector assembly, especially when a connector of the cable connector assembly connects with several different types of cables.

U.S. Pat. No. 6,203,376 B1 also discloses a cable clamp for holding a series of cables together therebetween. With the reference to FIGS. 7 and 8, the cable clamp 31 includes two halves 32a, 32b. Each half has a series of grooves 34 that are separated from each other by intervening land portions 35. Projecting posts 36 and corresponding recessed openings 37 for receiving the posts 36 are located in the wider, interior lands, while the thinner, exterior lands have projecting triangular-shaped lugs 38 with an associated and appropriately configured triangular groove 39. These sets of interengaging elements assist in holding the cables 27 in place therein and the two halves together during assembly. However, the two halves aren't still fixed at this time and they are preferably fixed together by some suitable means, such as ultrasonic welding, plastics welding, heat welding, adhesives or the like. This will undoubtedly complicate the assembling process and increase cost of the cable clamp.

Hence, it is desired to provide an improved cable holder to avoid the foregoing drawbacks.

SUMMARY OF THE INVENTION

A main object of the present invention is to provide a cable holder for a cable connector assembly which is easy to be manufactured and assembled so that a plurality of cables are positioned for ease in wire handling.

In order to achieve the objects set forth, a cable connector assembly in accordance with the present invention comprises a cable arrangement including multiple cables and a pair of cable holders for reliably holding the cables together in an array in side-by-side parallel relationship, and a pair of electrical connectors connected to two opposite ends of the cables. Each cable holder includes a pair of hermaphroditic half holding members each having a plurality of half receiving chambers. The half receiving chambers are separated from each other by intervening land portions. A plurality of latches and corresponding through slots are disposed on the land portion at two opposite sides of the receiving chambers. Each latch comprises a pair of latching arms projecting from an end surface of the land portion and each having a hook in a distal end thereof. A pair of shoulders are disposed at two opposite ends of the through slot for engaging with the hooks. The half receiving chamber has at least one retention rib.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Figure 1:
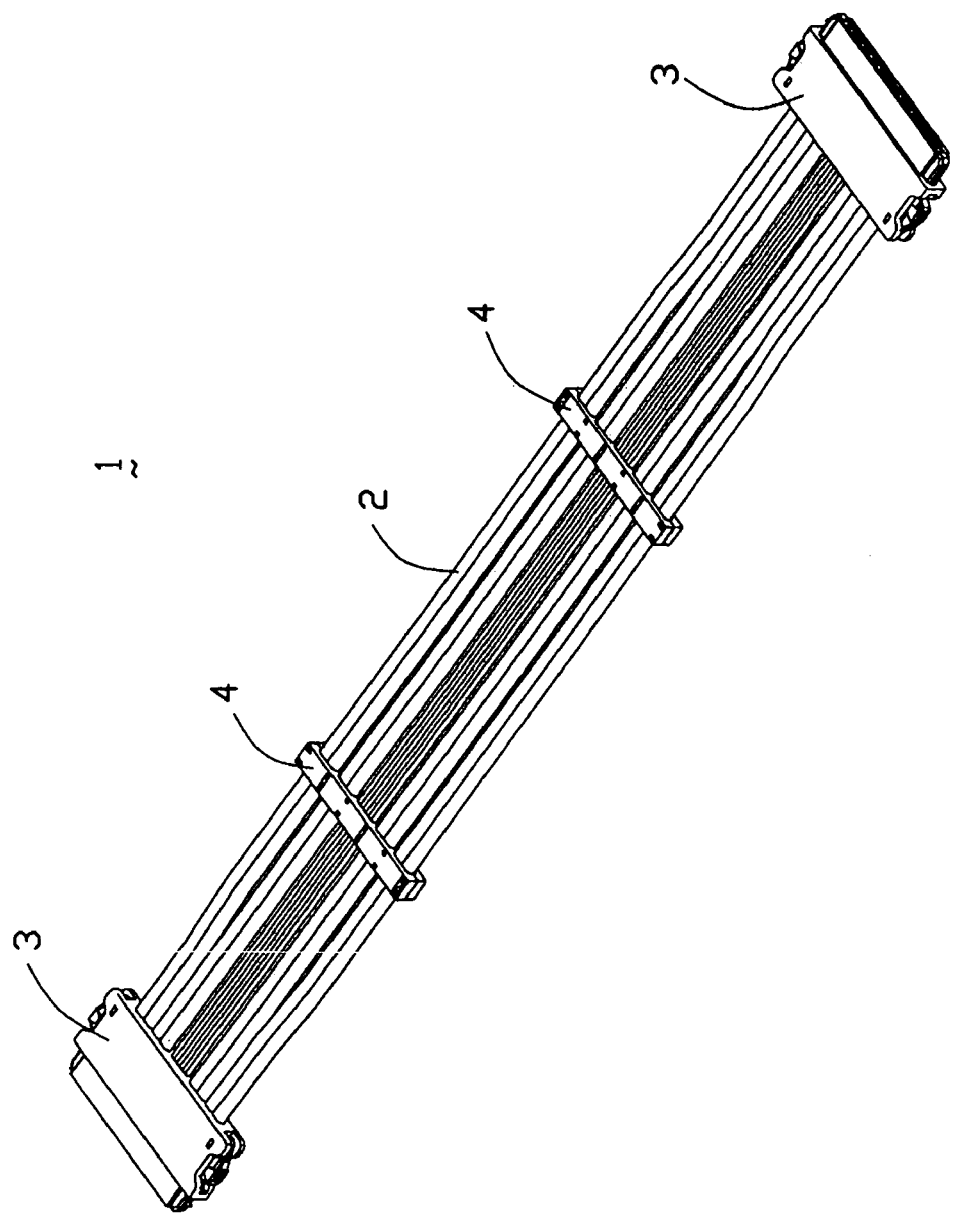
FIG. 1 is an assembled, perspective view of a cable connector assembly in accordance with the present invention.
Figure 2:
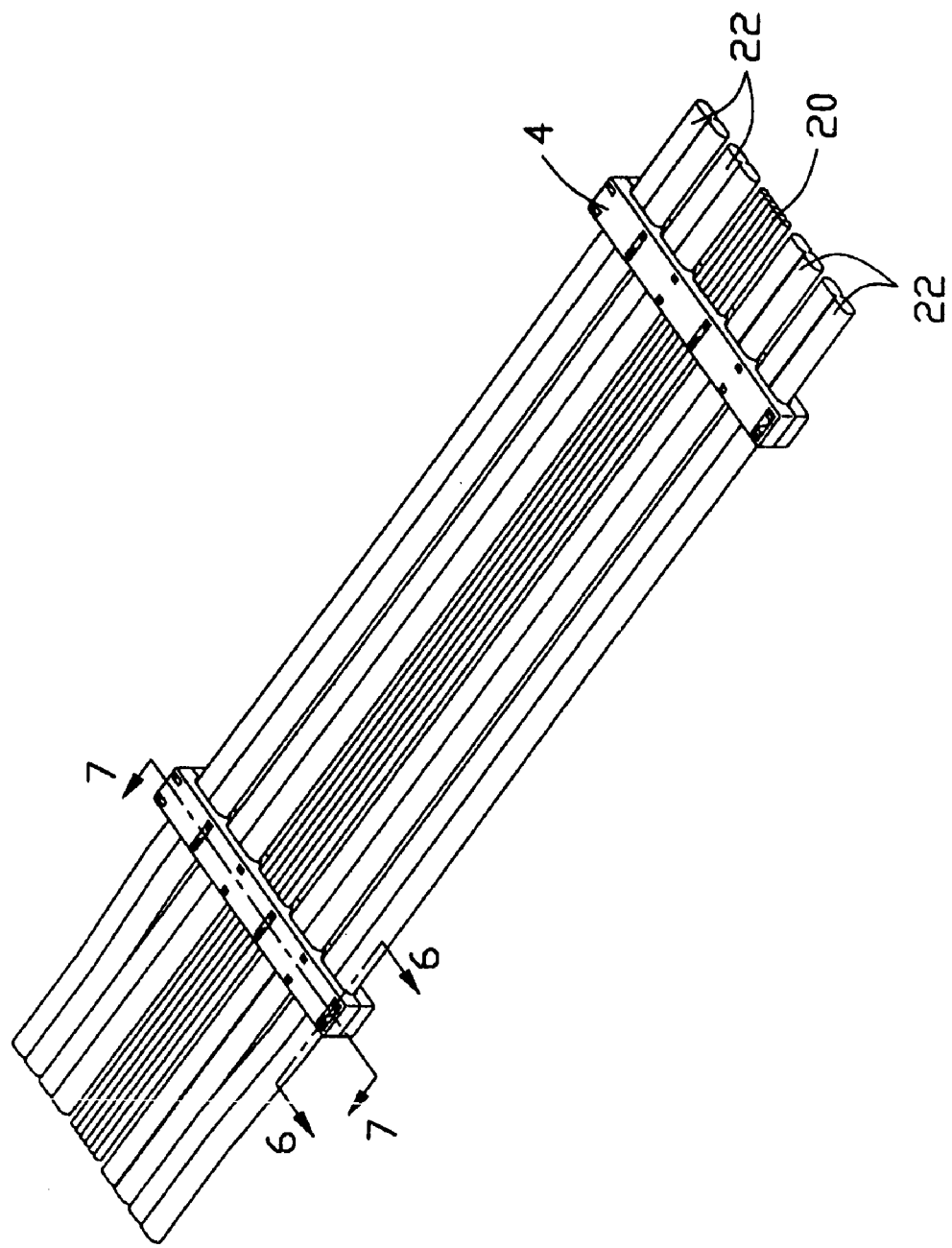
FIG. 2 is a perspective view of a cable arrangement with a pair of cable holders in accordance with the present invention.

Referring to FIGS. 1 and 2, a cable connector assembly 1 in accordance with the present invention is for connecting a mother board with a daughter board, and comprises a cable arrangement including multiple cables 2 and a pair of cable holders 4 respectively for reliably holding the cables 2 together in side-by-side parallel relationship, and a pair of electrical connectors 3 connected to opposite ends of the cables 2. The cables 2 include a flat cable 20 for transmitting side band signal and a plurality of Serial ATA cables 22 symmetrically distributed at two sides of the flat cable 20.

Referring to FIGS. 3 to 6, the cable holder 4 is rectangular and comprises a top and a bottom half holding members 5, 6, which are hermaphroditic in the preferred embodiment. The invention, however, is not limited thereto. The top and the bottom half holding members 5, 6 have an end surface 50, 60. Each half holding member 5/6 defines a center half receiving chamber 51 and a plurality of side half receiving chamber 51 distributed at two opposite sides of the center half receiving chamber 51 for respectively holding the flat cable 20 and the Serial ATA cables 22 therebetween. The center receiving chambers 51 for holding the flat cable 20 and the side receiving chamber 51 for holding the Serial ATA cable 22 have different sizes. Each half receiving chambers 51 are separated from each other by intervening land portions 52. A plurality of latches 53 and corresponding through slots 54 are disposed on the land portions 52 at two opposite sides of the receiving chambers 51. The land portion 52 having the latch 53 defines a pair of narrow through holes 55 therein, thus forming a bridge 56 between the pair of through holes 55. Each latch 53 has a pair of latching arms 530 projecting integrally and vertically from the end surface 50/60 of the land portion 52 along opposite sides of the bridge 56 and spaced a determined distance with each other. Each latching arm 530 has a hook 532 in a distal end thereof. A pair of shoulders 542 are disposed at two opposite ends of the through slot 54 for engaging with the hooks 532. The latch 53 having the hooks 532 and the slot 54 having the pair of shoulders 542 form a latching means so that the top and the bottom half holding members 5, 6 are reliably fixed together. A plurality of single rib and dual ribs 510 are spacedly disposed in the half receiving chambers 51 for retention of the cables.

Figure 3:
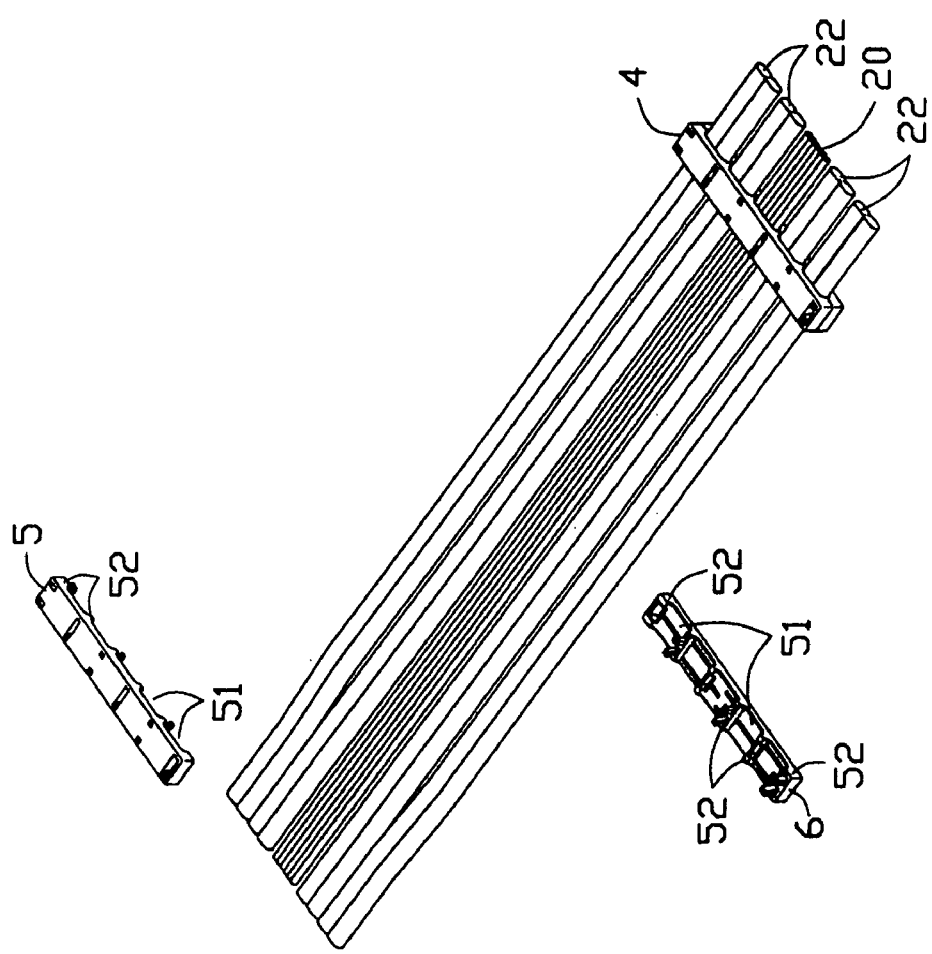
FIG. 3 is a view similar to FIG. 2, but showing before one of cable holders clamps with the cables.
Figure 4:
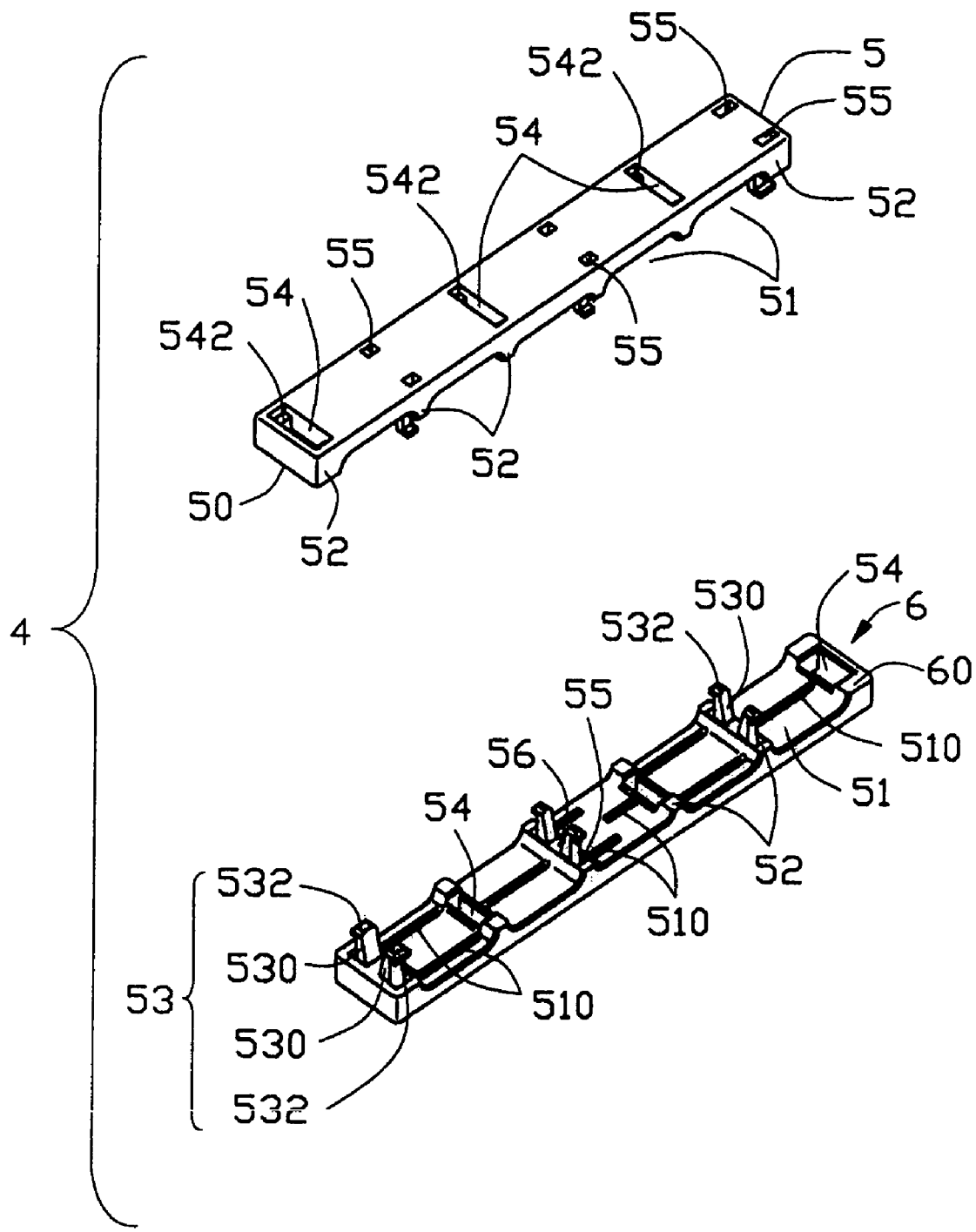
FIG. 4 is an exploded, perspective view of the cable holder of FIG. 3.
Figure 5:
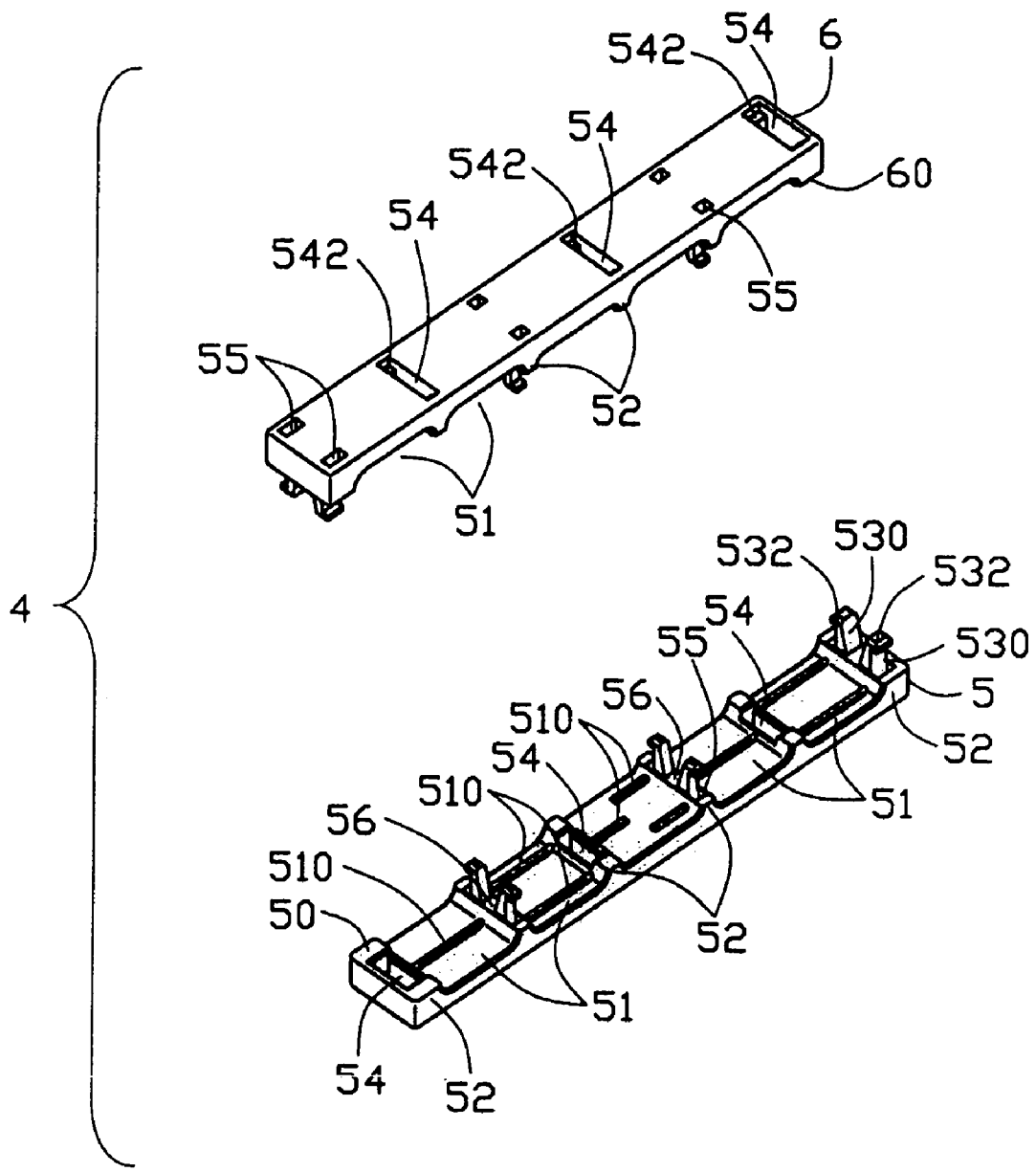
FIG. 5 is a view similar to FIG. 4, but taken from a bottom aspect.
Figure 6:
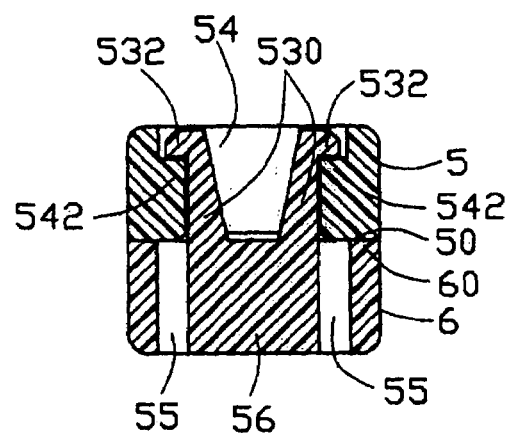
FIG. 6 is a cross-sectional view of the cable arrangement taken along line 6—6 of FIG. 2 showing a latching relationship between a top and a bottom half holding members.
Figure 7:
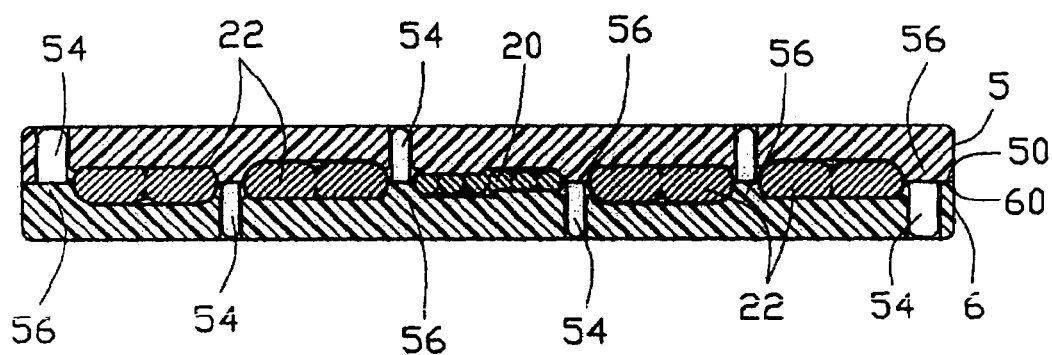
FIG. 7 is a cross-sectional view of the cable arrangement taken along line 7—7 of FIG. 2.

Referring to FIGS. 3, 6 and 7 in conjunction with FIG. 4, as the top and the bottom half holding members 5, 6 are assembled to each other, the hooks 532 of the latching arms 530 of one half holding member 5/6 contact with the shoulders 542 of the other half holding member 6/5. Then the pairs of latching arms 530 of one half holding member 5/6 deflect resiliently for allowing the half holding members 5/6 to further move toward the other half holding member 6/5. When the end surface 50/60 of one half holding member 5/6 abuts on the end surface 60/50 of the other half holding member 6/5, the latching arms 530 of one half holding member 5/6 are received in the through slots 54 of the other half holding member 6/5 with the pair of hook 532 latching with the pair of shoulders 542, so as to form the cable holder 4, and the cables are firmly sandwiched between a integral cavity formed by the two half receiving chambers 51 of the half holding members 5, 6.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable holder for holding multiple cables together in an array in side-by-side parallel relationship, comprising:
   a top holding member;
   a bottom holding member, wherein each of the top and the bottom holding members forming a plurality of receiving chambers for holding the cables therebetween;
   latching means comprising a plurality of latches disposed in one of the top and the bottom holding members and a plurality of through slots defined in another of the top and the bottom holding members; and
   a first and a second intervening land portions are disposed at opposite sides of each receiving chamber;
   wherein the first land portion defines a pair of narrow through holes therein and the narrow through holes forming a bridge therebetween, wherein each of the plurality of latches having a pair of latching arms projecting integrally and vertically from the first land portion along opposite sides of the bridge, and wherein each latching arm having a hook in a distal end thereof; and
   wherein each of the through slots disposed in the second land portion and a pair of shoulders are disposed at two opposite ends of the each through slot for engaging with the hook.

2. The cable holder as claimed in claim 1, wherein the top and the bottom holding members are hermaphroditic.

3. The cable holder as claimed in claim 1, wherein the each receiving chamber has at least one retention rib.

* * * * *